2,802,802

PLASTICIZATION OF VINYLIDENE RESINS WITH TRICARBALLYLATES

Robert J. Reid, Canal Fulton, William Mayo Smith, Jr., Cuyahoga Falls, and Byron H. Werner, Akron, Ohio, assignors to The Firestone Tire & Rubber Company, Akron, Ohio, a corporation of Ohio No Drawing. Application November 30, 1953, Serial No. 395,266

10 Claims. (Cl. 260—31.8)

This invention relates to the plasticizing of crystalline polymers and copolymers of vinylidene chloride.

These crystalline materials include both polymers of vinylidene chloride and copolymers thereof with not more than substantially 15 percent of other unsaturated compounds copolymerizable therewith. The copolymers contain at least substantially 85 percent of vinylidene chloride. Suitable comonomers for the copolymerization include, for example, vinyl chloride, vinyl fluoride, vinyl acetate, styrene, acrylic and methacrylic esters such as methylmethacrylate, ethylacrylate, and the like, acrylonitrile, methacrylonitrile, vinyl-type ethers and ketones such as methylvinyl ether, methylvinyl ketone and related compounds such as methylisopropenyl ketone, and the like. For a more complete list of compounds known to copolymerize with vinyl chloride to produce resins which can be plasticized as herein described see Krozil: "Kurzes Handbuch der Polymerisation-stechnik," vol. II, "Mehrstoffpolymerization" Edwards Bros., Inc., p. 739, the items indented under "vinylidene chloride."

Such resins are characterized by crystalline behavior, i. e., they fuse sharply to form relatively fluid melts which may be extruded, quenched and oriented to form strong films and filaments of crystalline character. A syndrome of this crystalline habit is the recalcitrance of these resins to compounding: The macromolecules of these resins prefer contact with each other and tend to reject any foreign substances such as plasticizers and the like. It is therefore very difficult to provide suitable compounding agents for these materials, and specifically to provide mutually compatible plasticizing agents therefor.

The problem of providing plasticizers for these crystalline resins is complicated not only by the fact that they tend to reject and spew the majority of conventional plasticizers, but the resins are extruded as hot melts and the temperature of the melts is such as to cause many conventional resin-compounding ingredients to tend to decompose or react with other compounding ingredients present.

The plasticizers of this invention are the trimethyl, triethyl, tri-n-propyl and tri-n-butyl tricarballylates, and more generally trialkyl tricarballylates each alkyl group of which contains 1 to 4 carbon atoms. They are excellent and efficient plasticizers, and have excellent light stability and good heat stability as well as good spew resistance. They are non-toxic and non-allergenic. With respect to spew resistance the ethyl and propyl esters have been found to be somewhat more satisfactory than the butyl ester. From the standpoint of spew resistance the tricarballylates have been found to be much more satisfactory than related compounds such as the citrates and aconitates which have poor spew resistance.

The tricarballylate esters are obtainable by simple esterification procedures.

The tricarballylates may be incorporated with the resins to the extent of 3 to 8, and not over 10 percent, based on the total weight of the resin. Less than 3 percent may be employed in admixture with other plasticizers. Such percentages will be stably retained within the resin.

It has been found that epoxy compounds (such as glycidylphenyl ether) and salicylates (such as phenyl salicylate and p-tert-butyl-phenyl salicylate), respectively, impart heat stability and light stability to these resins. Different tricarballylates were compounded with a resin copolymer of 85 percent vinylidene chloride and 15 percent vinyl chloride, both with and without these heat and light stabilizers.

The following table records results of tests obtained on samples compounded as follows:

| | Parts by weight |
|---|---|
| Copolymer of vinylidene chloride and vinyl chloride | 100 |
| Glycidylphenyl ether | 0 to 2 |
| 4-t-butylphenyl salicylate | 0 to 2 |
| Plasticizer | 4.5 |

The different compositions were tested for heat and light stability, and also rated for spewing. The methods of testing follow.

HEAT STABILITY

Five grams of the composition to be tested were charged into a compression mold of Hastelloy C (a 55/20/6/14/5 Ni/Mo/Fe/Cr/W alloy) in the form of a cylinder 1.25 inches in diameter. The molding cycle was—

1. Heat for three minutes with steam at 120 lbs./sq. in. and mold pressure of 1000 lbs./sq. in.;
2. Water cool for two minutes under 1000 lbs./sq. in. mold pressure; and
3. Eject from the press.

The resultant cylindrical button (1.25 inches in diameter and .125–.188 inch in height) was then cut into sector-shaped specimens which were placed in a forced-draft oven at 180° C. Specimens were removed at intervals of 10, 20 and 30 minutes after placing in the oven, and the behavior of the specimens on the test as a whole was noted and recorded.

LIGHT STABILITY

One gram samples of the compositions to be tested were placed between cellophane sheets and pressed in a flat platen laboratory press under a total of 1000 lbs. at a temperature of 180° C., yielding a plaque approximately 6 to 8 mils thick. The plaques were tested according to the method of ASTM test D620–45T under a sunlamp for 240 hours and the results are recorded in Column A.

Plaques were also tested in a weatherometer for 100 hours, and 200 hours, the reports of the tests for the respective durations being reported in Columns B and C. The weatherometer was a standard X–1–A machine, using a Corex D filter and operating without the sprays.

The ratings for heat and light stability were determined subjectively by the operator and recorded as "Excellent" (E), "Good" (G), "Fair" (F), and "Poor" (P).

SPEW RATING

A plaque of the compounded resin was pressed between cellophane sheets in a Carver press at 180° C., using approximately 1.5 grams of resin, 10 seconds preheat, and 15 seconds with the minimum pressure (pressure indicator just off zero). The plaque was quenched in cold water immediately and an approximately 3/8 inch wide strip was cut from the plaque, the cellophane removed, and the strip oriented to its limit.

Test strips were placed in glassine bags under mild pressure so that contact of the strips with the bag was assured. Any exudation of plasticizer could then be noted as an oily streak on the glassine. Tests were carried out at room temperature and at 50° C., the latter condition tending to accentuate any migration of plasticizer. No spew was noted at room temperature after 56 days, whereas with dioctyl phthalate definite spew occurred after one day.

The results of spew tests carried out at 50° C. for 56 days are given in Table I. "OK" designates that no spew was noticeable on the glassine at the end of the test period; and "Sl" indicates the presence of a very slight spew, nowhere near as objectionable as that obtained with most plasticizers, the product being entirely satisfactory for substantially all purposes.

*Table of test results*

| Plasticizer | GPE | BPS | Stability | | | | Spew Rating |
|---|---|---|---|---|---|---|---|
| | | | Heat | Light | | | |
| | | | | A | B | C | |
| Tributyl Tricarballylate | 0 | 0 | G | F | P | P | Sl |
| Do | 2 | 2 | G | E | E | E | Sl |
| Triethyl Tricarballylate | | | G | F | P | P | OK |
| Do | 2 | 2 | G | E | E | G | OK |
| Tri-n-propyl Tricarballylate | | | G | G | F | P | OK |
| Do | 2 | 2 | G | E | E | E | OK |

(In the table headings, GPE indicates glydicylphenyl ether and BPS indicates 4-t-butylphenyl salicylate. The figures under these headings refer to parts per hundred parts of the resin employed in the respective plaques.)

It is observed that the resins are compatible with the tricarballylates of this invention. The larger the alkyl groups, the greater the tendency to spew. It is also observed that these plasticizers can be employed satisfactorily with the stabilizers employed. Other stabilizers can be used. The plasticizers do not spew when used with polymeric resins of higher vinylidene chloride content, and can be used with vinylidene chloride polymer. Such compositions can be stabilized with the mentioned light and heat stabilizers.

Extrusion tests were made on material compounded with the plasticizers of this invention together with glycidylphenyl ether and 4-t-butylphenyl salicylate, as in the foregoing table. The filaments were extruded from the plasticized molten material very satisfactorily and showed good light stability in the weatherometer. The oriented filaments did not spew.

What we claim is:

1. A crystalline resin selected from the group consisting of polymers of vinylidene chloride with up to substantially 15 percent (based on the weight of said resin) of other unsaturated compound copolymerizable therewith, plasticized with a substantial amount and not over substantially 10 percent (based on the weight of the resin) of a trialkyl tricarballylate each alkyl group of which contains 1 to 4 carbon atoms.

2. A crystalline resin selected from the group consisting of polymers of vinylidene chloride with up to substantially 15 percent (based on the weight of said resin) of other unsaturated compounds copolymerizable therewith, plasticized with a substantial amount and not over substantially 10 percent (based on the weight of the resin) of tri-n-propyl-tricarballylate.

3. Crystalline copolymer composed of at least substantially 85 percent (based on the weight of the copolymer) of vinylidene chloride and a substantial amount up to substantially 15 percent of vinyl chloride, plasticized with a substantial amount and not over substantially 10 percent (based on the weight of the copolymer) of a trialkyl tricarballylate each alkyl group of which contains 1 to 4 carbon atoms.

4. Crystalline copolymer composed of at least substantially 85 percent (based on the weight of the copolymer) of vinylidene chloride and a substantial amount up to substantially 15 percent of vinyl chloride, plasticized with a substantial amount and not over substantially 10 percent (based on the weight of the copolymer) of tri-n-propyl-tricarballylate.

5. The process of plasticizing crystalline resin selected from the group consisting of polymers of vinylidene chloride with up to substantially 15 percent (based on the weight of said resin) of other unsaturated compound copolymerizable therewith, in which process there is added to the resin a substantial amount and not over substantially 10 percent (based on the weight of the resin of a trialkyl tricarballylate each alkyl group of which contains 1 to 4 carbon atoms.

6. The process of plasticizing crystalline resin selected from the group consisting of polymers of vinylidene chloride with up to substantially 15 percent (based on the weight of said resin) of other unsaturated compound copolymerizable therewith, in which process there is added to the resin a substantial amount and not over substantially 10 percent (based on the weight of the resin) of tri-n-propyl-tricarballylate.

7. The process of plasticizing crystalline copolymer composed of substantially 85 percent (based on the weight of the copolymer) of vinylidene chloride and a substantial amount up to substantially 15 percent of vinyl chloride in which process there is added to the copolymer a substantial amount and not over substantially 10 percent (based on the weight of the copolymer) of a trialkyl tricarballylate each alkyl group of which contains 1 to 4 carbon atoms.

8. The process of plasticizing crystalline copolymer composed of substantially 85 percent (based on the weight of the copolymer) of vinylidene chloride and a substantial amount up to substantially 15 percent of vinyl chloride in which process there is added to the copolymer a substantial amount and not over substantially 10 percent (based on the weight of the copolymer) of tri-n-propyl-tricarballylate.

9. In the process of extruding and orienting a crystalline resin selected from the group consisting of polymers of vinylidene chloride with up to 15 percent (based on the weight of said resin) of other saturated compounds copolymerized therewith, the improvement which comprises using as a processing aid in the molten resin a substantial amount and not over substantially 10 percent (based on the weight of the resin) of a trialkyl tricarballylate each alkyl group of which contains 1 to 4 carbon atoms.

10. In the process of extruding and orienting a crystalline resin selected from the group consisting of polymers of vinylidene chloride with up to 15 percent (based on the weight of said resin) of other saturated compounds copolymerized therewith, the improvement which comprises using as a processing aid in the molten resin a substantial amount and not over substantially 10 percent (based on the weight of the resin) of tri-n-propyl-tricarballylate.

References Cited in the file of this patent

UNITED STATES PATENTS

| 2,360,896 | Sarbach | Oct. 24, 1944 |
| 2,517,351 | Reid | Aug. 1, 1950 |

U. S. DEPARTMENT OF COMMERCE
PATENT OFFICE

CERTIFICATE OF CORRECTION

Patent No. 2,802,802                                    August 13, 1957

Robert J. Reid et al.

It is hereby certified that error appears in the printed specification of the above numbered patent requiring correction and that the said Letters Patent should read as corrected below.

Column 4, line 17, for "resin of" read -- resin) of --.

Signed and sealed this 4th day of March 1958.

(SEAL)
Attest:

KARL H. AXLINE
Attesting Officer

ROBERT C. WATSON
Commissioner of Patents